SERVO-CONTROLLED SHUTTERS FOR PINHOLE DETECTORS

Original Filed March 31, 1959 2 Sheets-Sheet 1

INVENTORS
JOHN J. LAREW
J. KIRK SNELL
BY
Robert R. Strack
THEIR ATTORNEY

SERVO-CONTROLLED SHUTTERS FOR PINHOLE DETECTORS

Original Filed March 31, 1959 2 Sheets-Sheet 2

INVENTORS
JOHN J. LAREW
J. KIRK SNELL
BY
Robert P. Strack
THEIR ATTORNEY

United States Patent Office

Re. 25,671
Reissued Oct. 27, 1964

25,671
SERVO-CONTROLLED SHUTTERS FOR PINHOLE DETECTORS

John J. Larew and Jacob Kirk Snell, Waynesboro, Va., assignors to General Electric Company, a corporation of New York Original No. 2,981,845, dated Apr. 25, 1961, Ser. No. 803,143, Mar. 31, 1959. Application for reissue Jan. 22, 1963, Ser. No. 253,535
7 Claims. (Cl. 250—219)

Matter enclosed in heavy brackets [ ] appears in the original patent but forms no part of this reissue specification; matter printed in italics indicates the additions made by reissue.

This invention relates to novel means for controlling the shutters associated with pinhole detectors for strip material.

In the use of pinhole detectors for strip material, it is important that the light admitted to the detection chambers forming a part of such apparatus be limited only to that light passed by holes in the material being inspected. This requirement arises particularly when it is required of such apparatus that it be able to detect very small holes, that is, on the order of 0.001 inch in diameter in tin plate to be used subsequently for the making of containers for food and other perishables. To eliminate such light, it has been the practice to provide on the detection chambers and interposed between the light source and the chamber a shutter adjacent each edge of the strip material. Such shutters are constructed or provided with means to insure that extraneous light is not admitted through the aperture in the chamber and it is of the utmost importance that they continually engage the edges of the strip material. However, in the modern usage of pinhole detectors, particularly where they are used in so-called continuous lines, the width of the strip material may change suddenly as the end of a roll of a strip material of one width has been inspected and a second roll of a strip material of a greater or lesser width is attached, as by welding, to the end of the preceding roll and the inspection and processing carried out in a continuous manner. Under these circumstances, the shutters may be called upon to move over a considerable distance and means may be provided to urge them toward the edges of the material. It is important that this means cause the shutters not only to be properly positioned, but if they engage the edges of the strip material to engage them with a proper amount of force to avoid bending of the strip material. It is further important that they be capable of movement away from the edge or movement outwardly when required. Also, such means should be able to accommodate themselves to any lateral movement of the strip which may occur.

Therefore, it is an object of this invention to provide a novel apparatus for the inspection of strip material which utilizes means for accurately controlling the position of the shutters associated with a detection chamber to insure that they are in constant proximity to the edge of the strip material being inspected.

It is another object of this invention to provide a novel means for the inspection of strip material in which shutters are provided to shield the edges of the strip material and further means are provided to detect any change in the width of the material being inspected or any lateral movement to insure proper positioning of the shutters with respect to the edges of the material.

It is a still further object of this invention to provide a novel apparatus for the inspection of strip material which includes means having a sensitivity to the edge of the strip material and effective to control the movement of the shutters associated with the detection device to insure proper positioning of the shutters with respect to the material.

It is still another object of this invention to provide a novel apparatus for use with pinhole detectors for strip material comprising means mounted on the shutters forming a part of such apparatus and having a sensitivity to the position of the edge of the material and effective to control the position of the shutters so that the shutters maintain a proper positioning with respect to the edge.

Briefly, in one embodiment of the invention there is provided a means mounted on each shutter of a pair of shutters movably mounted on the detection chamber of a pinhole detector for strip material, which means is capable of sensing the position of the edges of the strip material and a reversible motive power means controlled by the shutter mounted means to move the shutters in and out as the width of the strip changes or as the strip manifests any lateral movement.

The features of the invention which we believe to be novel are set forth with particularity in the appended claims. The invention itself, however, both as to its structure and method of operation together with further objects and advantages thereof, may best be understood by reference to the following description taken in connection with the accompanying drawings wherein:

Figures 1, 2A:
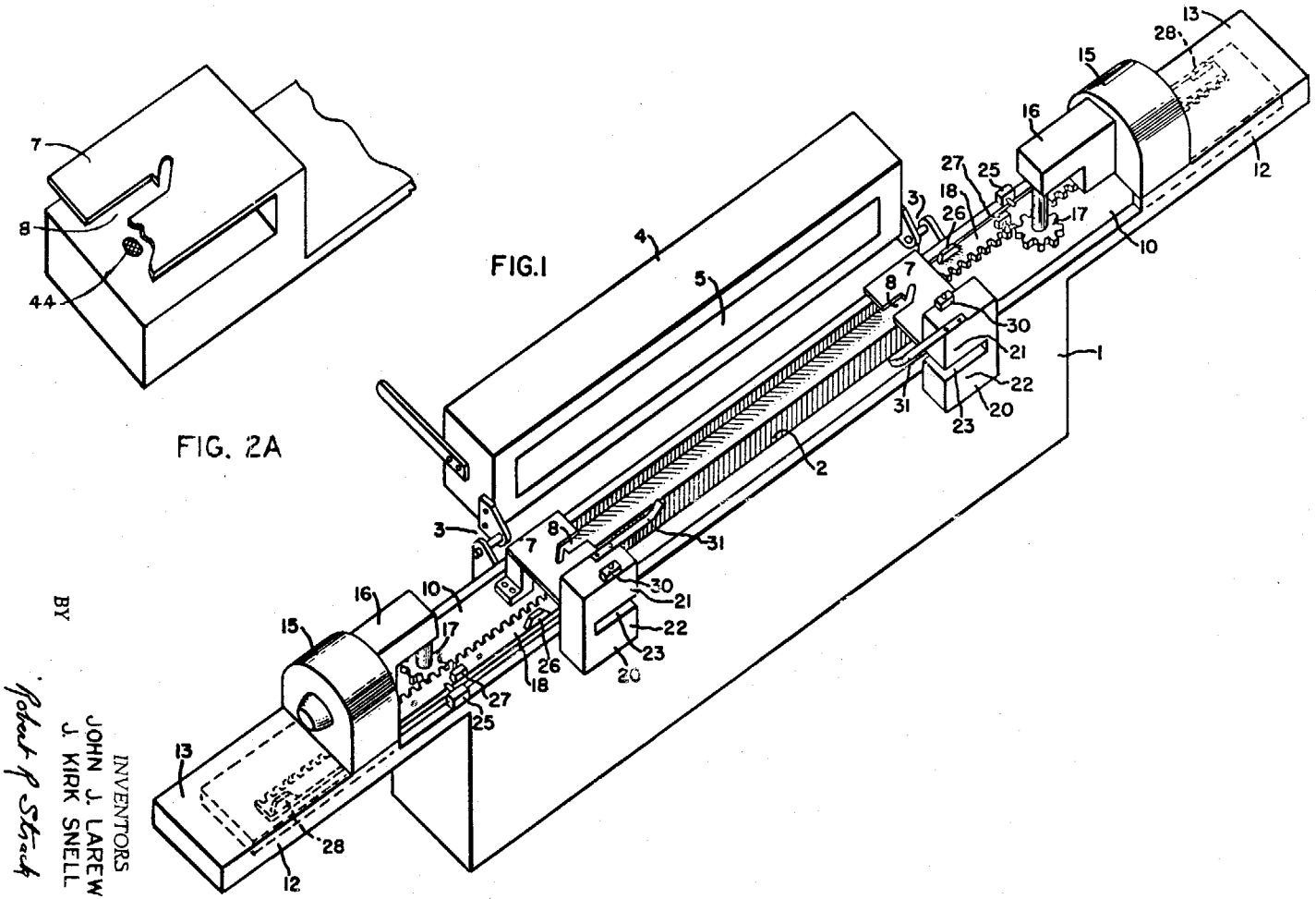
FIGURE 1 is an over-all view of a pinhole detector for strip material in accordance with the invention.
*FIGURE 2A is a partial diagrammatic view of an alternative embodiment of the invention;*

In the embodiment of the invention illustrated in FIGURE 1, the pinhole detecting apparatus may take the form of a detection chamber. Provided in an upper surface of the detection chamber 1 is a slotted aperture 2 having a relatively small width in order that the area of the material being inspected at any one time may be limited so that precise location of any defects may be accurately determined and having a length of such size to accommodate the greatest width of material it is desired to inspect. Pivotally mounted on the chamber 1 by means of suitable hinged brackets such as shown at 3 is a light source housing 4 shown in a raised or retracted position. In its normal position, the light source housing 4 is rotated about its connection with the chamber 1 so that a slotted opening 5 passing light from a source in the housing overlies the slotted aperture 2 in the chamber 1. Mounted in the detection chamber 1, but not shown in this drawing, are a suitable number of light sensitive devices responsive to light transmitted through the strip being inspected through the slotted aperture 2. Such light may be transmitted by defects in the nature of pinholes or the strip may be porous and it is desired to express this porosity in terms of light transmitted. Upon the energization of the light sensitive means in the chamber 1, a signal is provided which is utilized for a control or indicating purpose in a manner to be described in greater detail hereinafter.

Movably mounted on the upper surface of the chamber 1, there is provided at each end of the slotted aperture 2 a shutter 7. Each shutter is provided with a notch 8 in the forward edge thereof in order that the complete width of the complete material may be inspected. Each shutter is also provided with an extension 10, which extension is of such a length so that as the shutter moves forward to accommodate itself to strip material of varying widths the outer ends of the slotted aperture 2 are suitably covered to maintain the exclusion of extraneous light. Support for the shutters 7 together with their extensions 10 may be provided by means of the extensions 12 upon the chamber 1. Each extension is provided with a cover 13 protecting the extensions 10 when the shutters 7 are in their withdrawn or outer position.

In accordance with the invention, each shutter is provided with a reversible motive means to control its position in response to signals developed by an edge position sensing device. In this embodiment of the invention, the reversible motive means is shown as constituted by a motor 15 suitably connected to the chamber 1 and providing an output into a gear transmission system mounted in a housing 16. The gear transmission system 16 drives a suitable pinion 17 which is engageable with a rack 18 secured to the extension 10 of the shutter 7.

The edge position sensing means is provided for on a housing 20 having an upper portion 21 and a lower portion 22, and mounted on each of the shutters 7 so as to move therewith. The upper portion 21 and the lower portion 22 provide a space 23 therebetween lying in the path in which the strip material moves as it undergoes inspection. The nature of the edge sensing means carried in the housing 20 and its control connections to the motors 15 will be explained in greater detail. However, to complete the description of the figure of the drawing, the apparatus also may include a limit switch 25 having an actuating element engageable with a cam or other operator 26 on the outer end of the rack 18 and another limit switch 27 having an actuator engageable with a cam 28 on the outer end of the rack 18. In addition limit switches 30 may be provided on each of the housings 20 to be operated by cams 31 provided on the confronting housings.

Figure 2:
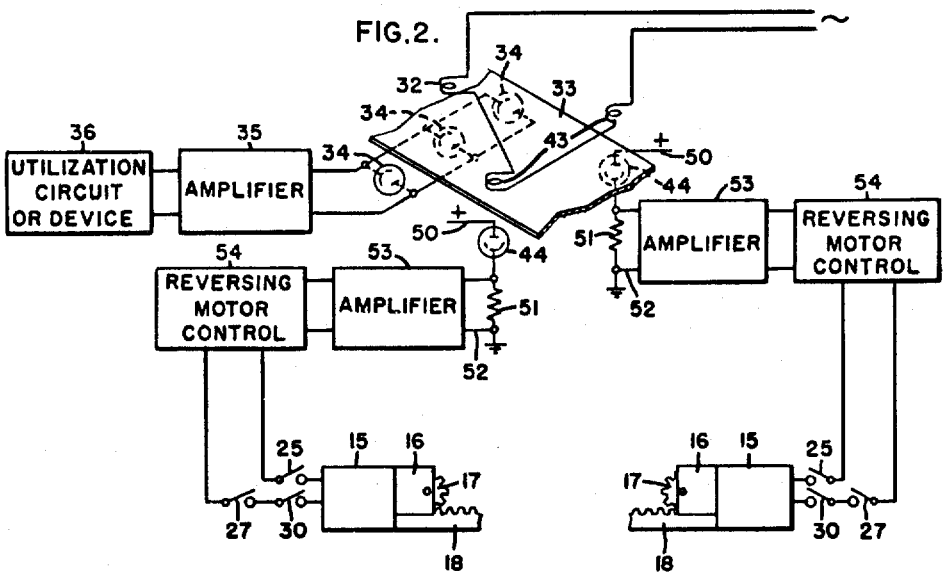
FIGURE 2 is a schematic illustration of the electrical circuits associated with the embodiment illustrated in FIGURE 1.

Referring now to FIGURE 2 of the drawing, the invention is shown as being constituted by a first light source 32 which is the light source mounted in the housing 4 and may be light either in the visible or invisible ranges. In the inspecting position, the source 32 is mounted on one side of the path of a movable strip of material such as is shown at 33, and upon the occurrence of any holes or openings in the strip 33 light will be transmitted therethrough and through the slotted aperture 2 to a plurality of light sensitive means 34 mounted in the chamber 1. The output of the light sensitive means 34 may be amplified by a suitable amplifier 35 and supplied thence to a utilization circuit or device 36. The utilization circuit or device forms no part of this invention and may be of any suitable type. Thus, it may be constituted by a means to place a mark on the strip 33 adjacent the defect as detected. Alternatively, the utilization circuit or device may be constituted by an electrical signal storage apparatus which will retain an indication of the detection of a defect and use such an indication at a subsequent point to reject the defective material from the line.

A pair of light sources 43 are disposed on one side of the path of each edge of the strip material. Disposed on the other side of the path of the edges of the strip material are photosensitive devices 44. Thus, in the embodiment illustrated in FIGURE 1 the light sources 43 could be mounted in the upper portions 21 of the housings 20 while the light sensitive devices 44 are mounted in the lower portions 22. While the apparatus is disclosed as constituted by housings 20 supporting the edge position sensing means, if a proper light source is available the light sensitive devices 44 could be mounted directly on the shuters 7 to respond to light from the source 32. *This alternative approach is illustrated, for example, in FIG. 2A which is an expanded view of a portion of such a shutter arrangement. The shutter used may be one such as shown in the patent to Rosen, 2,979,984.* Each of the light sensitive devices 44 is connected so as to be energized from a source of unidirectional potential supplied to a bus 50 to which one electrode of the device 44 is connected while its other electrode is connected through a suitable load resistor 51 to a neutral or ground bus 52. The light sensitive devices are arranged so that as the width of the strip material increases, the amount of light impinging on the devices 44 from the sources 43 would decrease thereby causing a decrease in the electrical signal supplied to amplifiers 53 associated with each of the light sensitive devices 44. If the width of the strip material were to decrease, the amount of light impinging on the devices 44 would increase and a signal of greater magnitude would be supplied to the amplifier 53. If there should be any lateral movement of this strip of material then, of course, the light on one device 44 will increase while the light on the other device 44 decreases, they will be effective to move their respective shuters 7 in opposite directions to maintain their proper positions with respect to the edges of the strip 33.

The output signals of the devices 44, after amplification by the amplifiers 53, are supplied to a suitable reversing control system 54 effective to control the in and out movement of the shutters 7. In the illustrated embodiment of the invention, the reversing control system is shown as being constituted by a reversing motor control apparatus 54 having an output to the motors 15. Shown schematically connected between the reversing motor control 54 and the reversible motors 15 are the limit switches 25, 27 and 30, which limit switches cooperate with the cams 28, 26 and 31 as briefly described above and as will be described in greater detail hereinafter.

Figure 3:
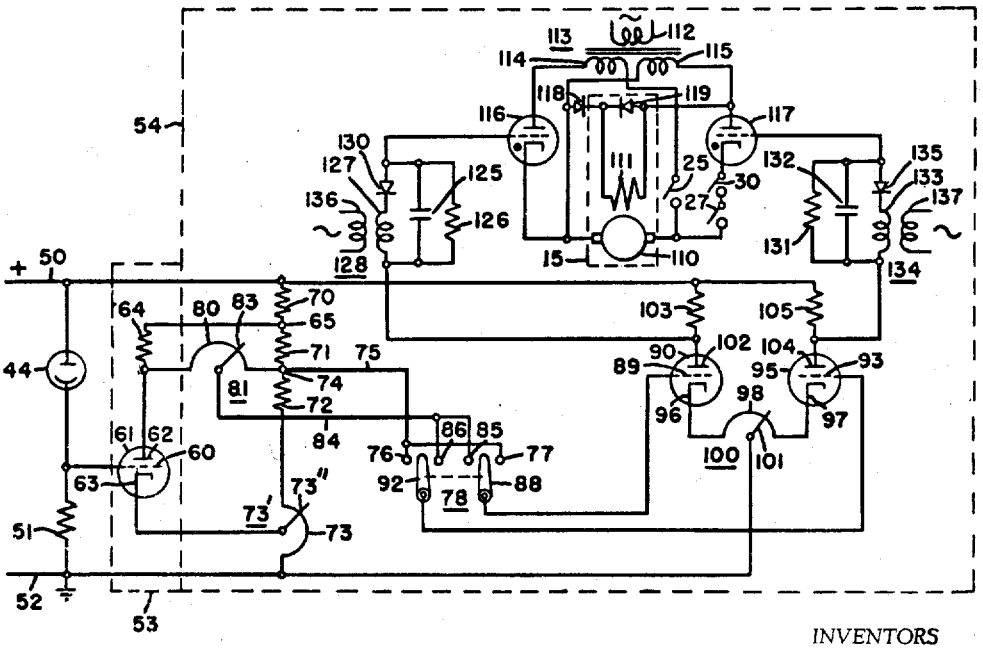
FIGURE 3 is a schematic diagram of a reversible motor control circuit usable in one embodiment of the invention.

Referring now to FIGURE 3 of the drawing, a suitable reversing motor control circuit is illustrated therein in conjunction with the motor 15, light sensitive device 44 and amplifier 53. This arrangement is shown by way of illustration only as it should be understood that other reversing motor control systems may be utilized in conjunction with the invention. Further, while FIGURE 3 illustrates an electrical control and motive system, it is obvious that other systems such as fluid controlled or energized systems may be used. The arrangement illustrated in FIGURE 3 comprises light sensitive device 44 connected between the positive bus 50 and the ground bus 52. Connected to one electrode of the device 44 is the control grid 60 of a vacuum tube amplifier 61 having an anode 62 and a cathode 63. The anode 62 is connected through a plate resistor 64 to a point 65 on a voltage divider constituted by the resistors 70, 71, 72 and resistance portion 73 of a potentiometer 73' connected between the buses 50 and 52. A slider 73'' of the potentiometer 73' is connected to the cathode 63 of the tube 61. Connected to a junction 74 on the voltage divider is a conductor 75 having connections to the terminals 76 and 77 of a double-pole double-throw switch 78. Connected to the junction 74 and to the anode 62 is a resistance element 80 of a potentiometer 81. A slider 83 of the potentiometer 81 is connected via a conductor 84 to terminals 85 and 86 of the double-pole double-throw switch 78. Connected to a first movable contact 88 of the switch 78 is the control grid 89 of a first or left-hand vacuum tube 90, while connected to a second movable contact 92 of the switch 78 is a control grid 93 of a second or right-hand vacuum tube 95. Cathodes 96 and 97 of the tubes 90 and 95 respectively are connected together through the resistance element 98 of a potentiometer 100 having a slider 101 connected to the ground bus 52. The anode 102 of the tube 90 is connected through a load resistor 103 to the positive bus 50, while the anode 104 of the tube 95 is similarly connected through a load resistor 105 to the positive bus 50. The arrangement is such that by connecting movable contacts 88 and 92 of the switch 78 to the terminals 77 and 86 or 76 and 85 either the grid 89 is connected to the slider 83 of the potentiometer 81 while the grid 93 is connected to the junction 74 of the voltage divider or the reverse connection is obtained. Assuming either connection, in the quiescent state the slider 101 of the potentiometer 100 is adjusted so as to maintain an equal current flow through the tubes 90 and 95. The slider 73″ on the potentiometer 73′ is adjusted so that when the edge of the strip is properly positioned or centered between the light sources 43 and light sensitive devices 44, an amount of current flows in the tube 61 such that the voltage on its anode 62 is equal to the voltage on the junction 74 of the voltage divider. Therefore, no voltage drop appears across the potentiometer 81 and equal signals appear on the control grids 85 and 93 of the tubes 90 and 95 respectively. If the strip being inspected should move or should change its width so as to permit more light to impinge on the device 44, conduction in the tube 61 will increase and, depending on the position of the switch 78, conduction in either the tube 90 or the tube 95 increases while conduction in the other tube decreases. If the condition should be one where the light on the device 44 decreases, tube 61 will conduct less and the tubes 90 and 95 change their conductivities in the opposite directions.

The voltages on the anodes 102 and 104 of the tubes 90 and 95 respectively may be used to control a reversible D.C. motor in the manner shown in the drawing. By way of example, the drawing illustrates a motor 15 having an armature 110 and a field winding 111. Means for energizing the motor is shown as being constituted by an alternating current supplied from a suitable source to the primary winding 112 of a transformer 113 having a pair of secondary windings 114 and 115. The secondary winding 114 is connected from one side through a gaseous discharge tube 116 to the armature of the motor and through the limit switch 25 to the other side of the transformer. The secondary winding 115 is connected at one end through a gaseous discharge tube 117 and the limit switches 27 and 30, and the armature of the motor to the other side of the winding. A unidirectional potential for energizing field winding 111 is derived from a rectifying device 118 connected across the primary winding 115 to the field 111. A freewheeling rectifier 119 may be provided to provide a path for current stored due to the inductance of the field winding 111. The arrangement shown is a half-wave motor control circuit in which the direction of rotation of the motor is determined by which of the gaseous discharge devices 116 or 117 is conducting.

Control of the gaseous discharge devices 116 and 117 is achieved by the provision of a means for supplying the anode voltage of the tube 90 to the control element of the device 116 and the anode voltage of the tube 95 to the control element of the device 117. This anode voltage which is, of course, a D.C. voltage, is superimposed upon an approximately saw-tooth shaped voltage produced by a phase shift circuit connected between the anodes 102 and 104 and the control elements of the gaseous discharge devices 116 and 117. The phase shift circuit associated with device 116 is constituted by a capacitor 125 and a resistor 126 connected across the secondary winding 127 of a transformer 128 and a rectifying device 130. The phase shift circuit associated with the device 117 is constituted by a resistor 131 and a capacitor 132 connected across the secondary winding 133 of a transformer 134 and a rectifying device 135. The transformers 128 and 134 are energized from an alternating current source connected to their primary windings 136 and 137 respectively.

In the over-all operation of the system, the elements described in detail above cooperate as follows. The strip material 33, which may be a strip of tin-plated steel, is passed between the light source housing 4 and chamber 1 and the light sources 32 and 43 energized. The positioning of the strip is such that the shutters 7 ordinarily assume a position of close proximity thereto so that the slots 8 thereof expose substantially the complete width of the material to inspection. The strip is then passed through the openings 23 in the housing 20 so that in the normal or proper position, the light from the sources 43 in the upper portions of the housings 21 is halved as it impinges on the light sensitive devices 44 mounted in the lower portions of the housings 22. As the strip material 33 moves through the detecting apparatus, upon the occurrence of a pinhole therein light passes through the slotted aperture 2 to impinge on the light sensitive means 34 to supply a signal which is amplified by the amplifier 35 and coupled to the utilization circuit or device 36 as described above. In the event that the width of the strip changes as when a new roll of material of greater or lesser width is added to the end of the roll, the inspection or processing of which has been completed, more or less light will be caused to impinge on the light sensitive devices 44.

In this situation, if the switch 78 is in the left-hand position as shown in FIGURE 3, the control grid 93 of the tube 95 will be connected to the junction 74 while the control grid 89 of the tube 90 will be connected to the slider 83 of the potentiometer 81. If the change in condition is one wherein the light increases, that is, by a diminishing of the width of the strip or a lateral movement of the strip, increased current will flow in the tube 61 causing the voltage on its anode 62 to drop. This decreases the voltage on the control grid 89 of the tube 90 causing the voltage on its anode 102 to rise thereby causing the gaseous discharge device 116 to fire earlier in the half cycle of the voltage applied to its anode and the motor 15 to rotate in a direction as to compensate for the increase in light on the device 44, that is, to drive its associated gear 17 in such a direction as to move the shutter 7 inwardly to restore the shutter 7 to its proper position with respect to the edge of the strip 33. If the change in condition is such as to decrease the light on the device 44, the opposite effect will occur and the motors 15 will be rotated in the opposite direction to withdraw the shutters 7 outwardly to accommodate themselves to the new position of the strip edges. The switch 78, depending on its position, determines the direction of motor rotation in response to light increase or decrease; thus, the circuit of FIGURE 3 can be used for either the right or left-hand shutter.

In order to prevent the shutters 7 from bumping into each other as they are moved inwardly under the control of their respective strip edge sensing means, the invention contemplates the provision of limit switches 30 mounted on each of the housings 20. As the shutters 7 are moved inwardly, a point will be reached wherein the cams 31 will act to operate their associated limit switches 30. The arrangement of the limit switches is such that they are normally closed and will be opened upon actuation by their respective cams 31 to interrupt energization of the motor and, therefore, movement of the shutter 7. A further control means is provided by virtue of the limit switches 25 and 27. In order to limit the outward movement of the shutters 7, the limit switch 25 is adapted to be closed by a suitable camming surface 26 on the racks 18. Upon actuation by the cam 26, the limit switch 25 will open to interrupt energization of the motor in that direction of motion. Upon inward movement of the shutters 7, the limit switch 27 is adapted to be energized by the camming surface 28 on each of the racks 18 so that an inward limit of movement is provided.

While we have shown a particular embodiment of our invention, it will be understood, of course, that we do not wish to be limited thereto since many modifications may be made by those skilled in the art without departing from the invention. We, therefore, aim in the appended claims to cover such equivalent variations as come within the true scope and spirit of our invention.

What we claim as new and desire to secure by Letters Patent of the United States is:

1. Inspection apparatus for moving strip material comprising a source of light, a slotted chamber confronting said source and spaced therefrom whereby a path for the movement of the strip material is provided therebetween, light sensitive means disposed in said chamber, movable shutters mounted on each end of said chamber of such length to cover a substantial portion of the slot in said chamber at one extremity of their movement, reversible drive means connected to said shutters, each shutter having mounted thereon a light source disposed as to be on one side of the path of the strip material and a light sensitive device disposed so as to be on the other side of the path of the strip material, and means connected to each light sensitive device and to said reversible drive effective to control the amount and direction of the movement of said reversible drive means in response to increased or decreased light on said light sensitive device as the width of the strip material changes or as it moves laterally.

2. Inspection apparatus for moving strip material comprising a source of light, a chamber having a slotted aperture therein confronting said source and spaced therefrom whereby a path for the movement is provided therebetween, light sensitive means mounted in said chamber to receive light emanating from said source and transmitted by the strip material through said slotted aperture, movable shutters mounted on the apparatus adjacent each end of said slotted aperture in proximity to the edges of the strip material, reversible drive means connected to each of said shutters, each shutter having mounted thereon a light source disposed above the path of each edge of the strip material and a light sensitive means disposed below the path of each edge of the strip material, and means connected to each light sensitive device and to said reversible drive means effective to control the direction of movement and extent of movement of said shutters in response to increased or decreased light on said light sensitive devices as the width of the strip material changes or as it moves laterally.

3. The apparatus in claim 2 in combination with means to limit the movement of said shutters.

4. Inspection apparatus for moving strip material comprising a source of light, a chamber having a slotted aperture therein confronting said source and spaced therefrom whereby a path for the movement is provided therebetween, light sensitive means mounted in said chamber to receive light emanating from said source and transmitted by the strip material through said slotted aperture, utilization means connected to said light sensitive means, movable shutters mounted on said chamber at each end of said slotted aperture engageable with the edges of the strip material, reversible drive means connected to each of said shutters, each shutter having mounted thereon [a light source disposed above the path of each edge of the strip material and] a light sensitive means disposed below the path of each edge of the strip material, and means connected to each light sensitive device and to said reversible drive means effective to control the direction of movement and extent of movement of said shutters in response to increased or decreased light on said light sensitive devices as the width of the strip material changes or as it moves laterally.

5. In a pinhole detecting apparatus having a light source, an inspection chamber spaced from the light source providing a path for the movement of strip material therebetween, light sensitive means mounted in the chamber and a pair of strip edge engaging shutters movably mounted on the apparatus, the improvement comprising means mounted on at least one shutter for sensing each edge of the strip material, reversible motor means mounted on the apparatus and engaging the shutter for imparting movement to the shutter, and means responsive to said first-mentioned means for controlling the in and out movement of the shutter as the width of the strip material changes or in accordance with its lateral movement.

6. In a pinhole detecting apparatus having a light source, an inspection chamber spaced from the light source providing a path for the movement of strip material therebetween, light sensitive means mounted in the chamber and a pair of strip edge engaging shutters movably mounted on the chamber, the improvement comprising a light source [mounted on each shutter] on one side of the path of the strip material, a light sensitive device mounted on each shutter on the other side of the path of the strip material whereby the amount of light impinging on said light sensitive device is proportional to the extent to which the strip material is interposed between said source and said device, reversible motor means connected to each shutter and means responsive to the amount of light impinging on each said device for controlling said reversible motor means.

7. *Inspection apparatus for moving strip material comprising, a light source, an inspection chamber spaced from said light source providing a path for the movement of strip material therebetween, light sensitive means mounted in the chamber, a pair of strip edge engaging shutters movably mounted on the apparatus, a light sensitive device mounted on each shutter on the opposite side of the path of said strip material from said light source whereby the amount of light impinging on said light sensitive devices is proportional to the extent to which the strip material is interposed between said source and said devices, reversible motor means connected to each shutter, and means responsive to the amount of light impinging on each said device for controlling said reversible motor means.*

References Cited by the Examiner

The following references, cited by the examiner, are of record in the patented file of this patent or the original patent.

UNITED STATES PATENTS

| | | | |
|---|---|---|---|
| 2,395,181 | 2/44 | Hags | 250—219 |
| 2,739,503 | 3/56 | Nieman et al. | 250—219X |
| 2,810,316 | 10/57 | Snyder | 250—219X |
| 2,886,716 | 5/59 | Camp | 250—237X |

RALPH G. NILSON, *Primary Examiner.*